(12) United States Patent
Doan et al.

(10) Patent No.: US 7,904,117 B2
(45) Date of Patent: Mar. 8, 2011

(54) WIRELESS COMMUNICATION DEVICE USING ADAPTIVE BEAMFORMING

(75) Inventors: Chinh H. Doan, Santa Clara, CA (US); Sohrab Emami-Neyestanak, San Francisco, CA (US); John Marshall, Danville, CA (US); Chuen-Shen Shung, San Jose, CA (US); Tim Arthur Williams, Danville, CA (US); Robert W. Brodersen, Berkeley, CA (US); Jeffrey M. Gilbert, Cupertino, CA (US); Ada Shuk Yan Poon, San Leandro, CA (US)

(73) Assignee: SIBEAM, Sunnyvale, CA (US)

( * ) Notice: Subject to any disclaimer, the term of this patent is extended or adjusted under 35 U.S.C. 154(b) by 0 days.

(21) Appl. No.: 11/202,995

(22) Filed: Aug. 12, 2005

(65) Prior Publication Data

US 2007/0037528 A1     Feb. 15, 2007

(51) Int. Cl.
*H04M 1/00*   (2006.01)
*H04W 4/00*   (2009.01)
*H03C 7/00*   (2006.01)

(52) U.S. Cl. .................. 455/562.1; 455/575.7; 370/334; 375/315

(58) Field of Classification Search ............... 455/562.1, 455/550.1, 556.1, 575.7; 370/468; 342/374
See application file for complete search history.

(56) References Cited

U.S. PATENT DOCUMENTS

| | | | |
|---|---|---|---|
| 5,634,199 A | | 5/1997 | Gerlach et al. |
| 6,898,250 B2 * | | 5/2005 | Lee et al. .................. 375/267 |
| 2002/0103013 A1 * | | 8/2002 | Watson et al. ............. 455/562 |
| 2003/0161410 A1 * | | 8/2003 | Smith et al. ............... 375/267 |
| 2004/0217948 A1 | | 11/2004 | Kawasaki et al. |
| 2005/0136990 A1 * | | 6/2005 | Hardacker et al. ........... 455/572 |
| 2006/0030364 A1 * | | 2/2006 | Olesen et al. ............. 455/562.1 |
| 2006/0145921 A1 * | | 7/2006 | Ranta et al. ................ 342/374 |
| 2006/0209892 A1 * | | 9/2006 | MacMullan et al. ........ 370/468 |

FOREIGN PATENT DOCUMENTS

| | | |
|---|---|---|
| EP | 1 175 022 A2 | 1/2002 |
| EP | 1175022 A2 | 1/2002 |
| EP | 1 447 925 A2 | 8/2004 |
| EP | 1447925 A2 | 8/2004 |
| RU | 2163052 C2 | 2/2001 |
| RU | 2232485 C2 | 7/2003 |

OTHER PUBLICATIONS

PCT International Preliminary Search Report PCT/US2006/31306 mailed Feb. 21, 2008 (1 page).
PCT Written Opinion PCT/US2006/31306 mailed Feb. 21, 2008 (6 pages).
European Office Action for European Patent Application No. EP 06 801 212.9, dated Mar. 16, 2009, 3 pages.
Russian Office Action for Russian Patent Application No. 2008109239, dated Jun. 26, 2009, 4 Pages.

* cited by examiner

*Primary Examiner* — Nick Corsaro
*Assistant Examiner* — Huy C Ho
(74) *Attorney, Agent, or Firm* — Blakely, Sokoloff, Taylor & Zafman LLP

(57) ABSTRACT

A method and apparatus is disclosed herein for wireless communication with adaptive beamforming. In one embodiment, the apparatus comprises a processor, a radio frequency (RF) transmitter having a digitally controlled phased array antenna coupled to and controlled by the processor to transmit content using adaptive beamforming, and an interface to a wireless communication channel coupled to the processor to communicate antenna information relating to the use of the phased array antenna and to communicate information to facilitate playing the content at another location.

43 Claims, 3 Drawing Sheets

WIRELESS COMMUNICATION DEVICE USING ADAPTIVE BEAMFORMING

FIELD OF THE INVENTION

The present invention relates to the field of wireless communication; more particularly, the present invention relates to a wireless communication device that uses adaptive beamforming.

BACKGROUND OF THE INVENTION

In 1998, the Digital Display Working Group (DDWG) was formed to create a universal interface standard between computers and displays to replace the analog VGA connection standard. The resulting standard was the Digital Visual Interface (DVI) specification, released in April 1999.

There are a number of content protection schemes available. For example, HDCP and DTCP are well-known content protection schemes. HDCP was proposed as a security component for DVI and was designed for digital video monitor interfaces.

HDMI is a connection standard that combines DVI and HDCP. HDMI was developed to meet the explosive demand for high-definition audio and video. Both DVI and HDMI have two key advantages. First, both integrate all video and sound signals onto a single, thin cable, thereby substantially simplifying the connection of components. Second, the content sent over the cable remains in its original, uncompressed digital format.

HDCP is a system for protecting content being transferred over DVI and HDMI from being copied. See HDCP 1.0. HDCP provides authentication, encryption, and revocation. Specialized circuitry in the playback device and in the display monitor encrypts video data before it is sent over. With HDCP, content is encrypted immediately before (or inside) the DVI or HDMI transmitter chip and decrypted immediately after (or inside) the DVI or HDMI receiver chip.

In addition to the encryption and decryption functions, HDCP implements authentication to verify that the receiving device (e.g., a display, a television, etc.) is licensed to receive encrypted content. Re-authentication occurs approximately every two seconds to continuously confirm the security of the DVI or HDMI interface. If, at any time, re-authentication does not occur, for example by disconnecting a device and/or connecting an illegal recording device, the source device (e.g., a DVD player, a set-top box, etc.) ends transmission of encrypted content.

While discussions of HDMI and DVI are generally focused on wired communication, the use of wireless communication to transmit content has become more prevalent every day. While much of the current focus is on cellular technologies and wireless networks, there has been a growing interest in the unlicensed spectrum around 60 GHz. More specifically, 7 GHz of contiguous bandwidth has been opened for unlicensed use at millimeter-wave frequencies around 60 GHz in the U.S. and Japan.

SUMMARY OF THE INVENTION

A method and apparatus is disclosed herein for wireless communication with adaptive beamforming. In one embodiment, the apparatus comprises a processor, a radio frequency (RF) transmitter having a digitally controlled phased array antenna coupled to and controlled by the processor to transmit content using adaptive beamforming, and an interface to a wireless communication channel coupled to the processor to communicate antenna information relating to the use of the phased array antenna and to communicate information to facilitate playing the content at another location.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
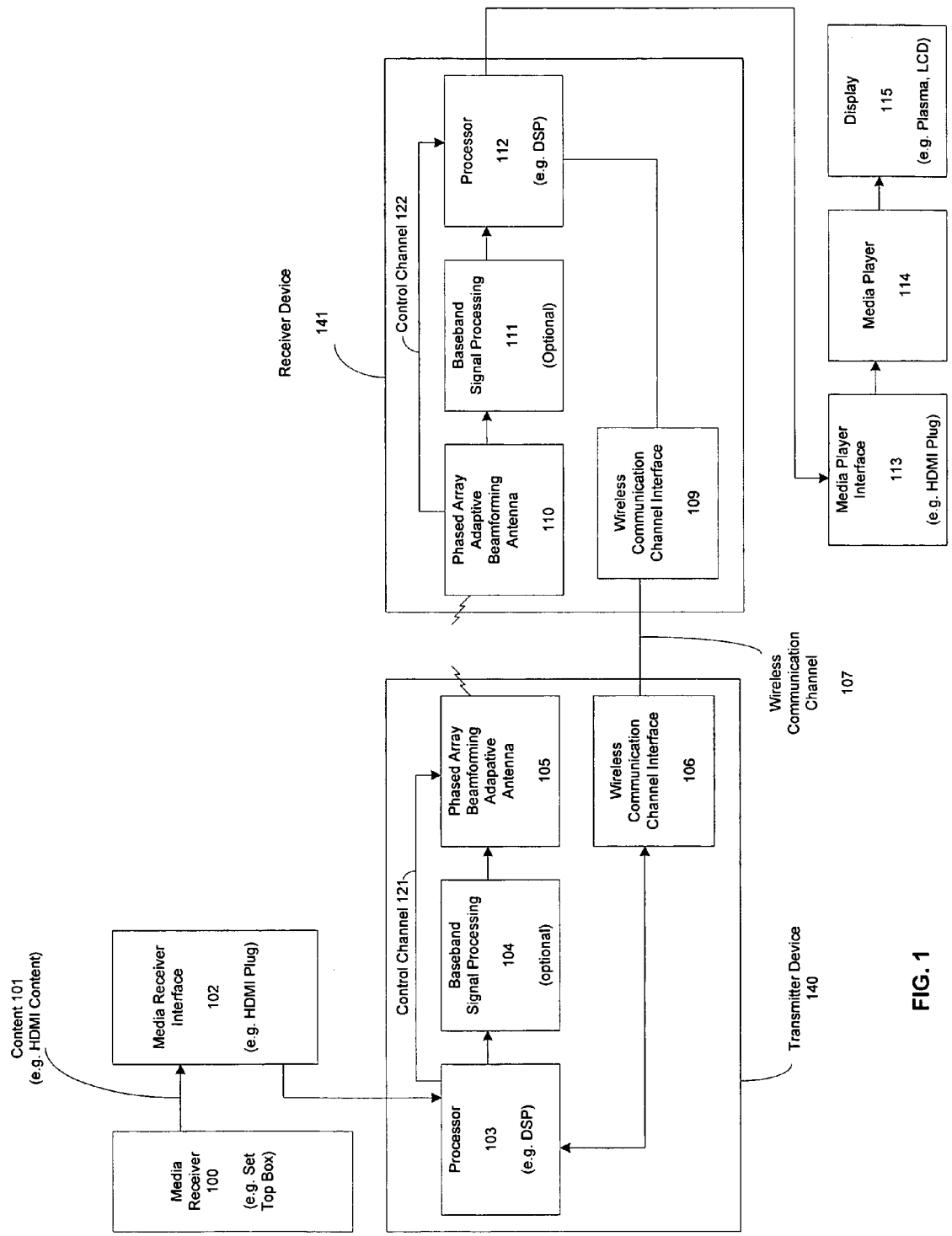
FIG. 1 is a block diagram of one embodiment of a communication system.

An apparatus and method for wireless communication is disclosed. In one embodiment, the wireless communication occurs using a wireless transceiver with an adaptive beamforming antenna. As would be apparent to one skilled in the art, the wireless communication could occur with a wireless receiver or transmitter.

In one embodiment, the wireless communication includes an additional link, or channel, for transmitting information between a transmitter and a receiver. The link may be uni-directional or bi-directional. In one embodiment, the channel is used to send antenna information back from a receiver to a transmitter to enable the transmitter to adapt its antenna array by steering the antenna elements to find a path to another direction. This may be obstacle avoidance.

In one embodiment, the link is also used to transfer information corresponding to the content that is being transferred wirelessly (e.g., wireless video). This information may be content protection information. For example, in one embodiment, the link is used to transfer encryption keys and acknowledgements of encryption keys when the transceivers are transferring HDMI data. Thus, in one embodiment, the link transfers control information and content protection information.

This additional link may be a separate channel in the 60 GHz band. In an alternative embodiment, the link may be a wireless channel in the 2.4 GHz band.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

An Example of a Communication System

FIG. 1 is a block diagram of one embodiment of a communication system. Referring to FIG. 1, the system comprises media receiver 100, a media receiver interface 102, a transmitting device 140, a receiving device 141, a media player interface 113, a media player 114 and a display 115.

Media receiver 100 receives content from a source (not shown). In one embodiment, media receiver 100 comprises a set top box. The content may comprise baseband digital video, such as, for example, but not limited to, content adhering to the HDMI or DVI standards. In such a case, media receiver 100 may include a transmitter (e.g., an HDMI transmitter) to forward the received content.

Media receiver 101 sends content 101 to transmitter device 140 via media receiver interface 102. In one embodiment, media receiver interface 102 includes logic that converts content 101 into HDMI content. In such a case, media receiver interface 102 may comprise an HDMI plug and content 101 is sent via a wired connection; however, the transfer could occur through a wireless connection. In another embodiment, content 101 comprises DVI content.

In one embodiment, the transfer of content 101 between media receiver interface 102 and transmitter device 140 occurs over a wired connection; however, the transfer could occur through a wireless connection.

Transmitter device 140 wirelessly transfers information to receiver device 141 using two wireless connections. One of the wireless connections is through a phased array antenna with adaptive beamforming. The other wireless connection is via wireless communications channel 107, referred to herein as the back channel. In one embodiment, wireless communications channel 107 is uni-directional. In an alternative embodiment, wireless communications channel 107 is bi-directional.

Receiver device 141 transfers the content received from transmitter device 140 to media player 114 via media player interface 113. In one embodiment, the transfer of the content between receiver device 141 and media player interface 113 occurs through a wired connection; however, the transfer could occur through a wireless connection. In one embodiment, media player interface 113 comprises an HDMI plug. Similarly, the transfer of the content between media player interface 113 and media player 114 occurs through a wired connection; however, the transfer could occur through a wireless connection.

Media player 114 causes the content to be played on display 115. In one embodiment, the content is HDMI content and media player 114 transfer the media content to display via a wired connection; however, the transfer could occur through a wireless connection. Display 115 may comprise a plasma display, an LCD, a CRT, etc.

Note that the system in FIG. 1 may be altered to include a DVD player/recorder in place of a DVD player/recorder to receive, and play and/or record the content.

Figure 3:
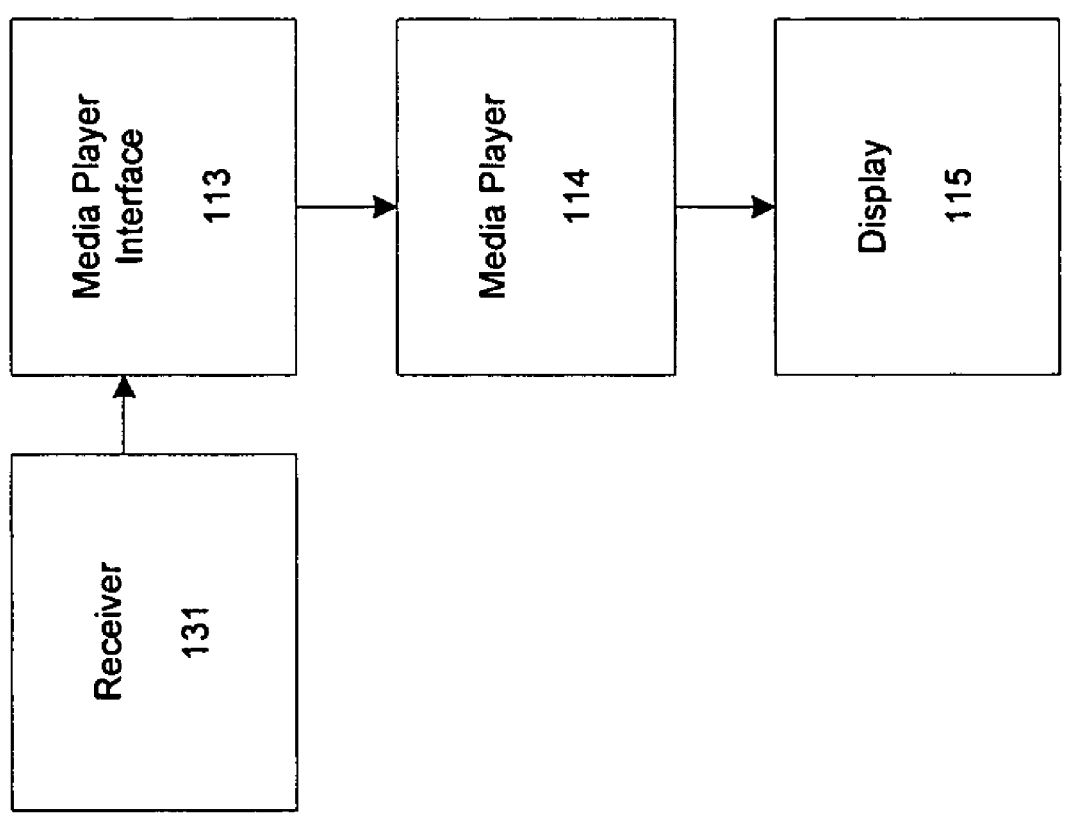
FIG. 3 is a block diagram of one embodiment of a peripheral device.

In one embodiment, transmitter 140 and media receiver interface 102 are part of media receiver 100. Similarly, in one embodiment, receiver 140, media player interface 113, and media player 114 are all part of the same device. In an alternative embodiment, receiver 140, media player interface 113, media player 114, and display 115 are all part of the display. An example of such a device is shown in FIG. 3.

In one embodiment, transmitter device 140 comprises a processor 103, an optional baseband processing component 104, a phased array antenna 105, and a wireless communication channel interface 106. Phased array antenna 105 comprises a radio frequency (RF) transmitter having a digitally controlled phased array antenna coupled to and controlled by processor 103 to transmit content to receiver device 141 using adaptive beamforming.

In one embodiment, receiver device 141 comprises a processor 112, an optional baseband processing component 111, a phased array antenna 110, and a wireless communication channel interface 109. Phased array antenna 110 comprises a radio frequency (RF) transmitter having a digitally controlled phased array antenna coupled to and controlled by processor 112 to receive content from transmitter device 140 using adaptive beamforming.

In one embodiment, processor 103 generates baseband signals that are processed by baseband signal processing 104 prior to being wirelessly transmitted by phased array antenna 105. In such a case, receiver device 141 includes baseband signal processing to convert analog signals received by phased array antenna 110 into baseband signals for processing by processor 112. In one embodiment, the baseband signals are orthogonal frequency division multiplex (OFDM) signals.

In one embodiment, transmitter device 140 and/or receiver device 141 are part of separate transceivers.

Transmitter device 140 and receiver device 141 perform wireless communication using phased array antenna with adaptive beamforming that allows beam steering. Beamforming is well known in the art. In one embodiment, processor 103 sends digital control information to phased array antenna 105 to indicate an amount to shift one or more phase shifters in phased array antenna 105 to steer a beam formed thereby in a manner well-known in the art. Processor 112 uses digital control information as well to control phased array antenna 110. The digital control information is sent using control channel 121 in transmitter device 140 and control channel 122 in receiver device 141. In one embodiment, the digital control information comprises a set of coefficients. In one embodiment, each of processors 103 and 112 comprises a digital signal processor.

Wireless communication link interface 106 is coupled to processor 103 and provides an interface between wireless communication link 107 and processor 103 to communicate antenna information relating to the use of the phased array antenna and to communicate information to facilitate playing the content at another location. In one embodiment, the information transferred between transmitter device 140 and receiver device 141 to facilitate playing the content includes encryption keys sent from processor 103 to processor 112 of receiver device 141 and one or more acknowledgments from processor 112 of receiver device 141 to processor 103 of transmitter device 140.

Wireless communication link 107 also transfers antenna information between transmitter device 140 and receiver device 141. During initialization of the phased array antennas 105 and 110, wireless communication link 107 transfers information to enable processor 103 to select a direction for the phased array antenna 105. In one embodiment, the information includes, but is not limited to, antenna location information and performance information corresponding to the antenna location, such as one or more pairs of data that include the position of phased array antenna 110 and the signal strength of the channel for that antenna position. In another embodiment, the information includes, but is not limited to, information sent by processor 112 to processor 103 to enable processor 103 to determine which portions of phased array antenna 105 to use to transfer content.

When the phased array antennas 105 and 110 are operating in a mode during which they may transfer content (e.g., HDMI content), wireless communication link 107 transfers an indication of the status of communication path from the processor 112 of receiver device 141. The indication of the status of communication comprises an indication from processor 112 that prompts processor 103 to steer the beam in another direction (e.g., to another channel). Such prompting may occur in response to interference with transmission of portions of the content. The information may specify one or more alternative channels that processor 103 may use.

In one embodiment, the antenna information comprises information sent by processor 112 to specify a location to which receiver device 141 is to direct phased array antenna 110. This may be useful during initialization when transmitter device 140 is telling receiver device 141 where to position its antenna so that signal quality measurements can be made to identify the best channels. The position specified may be an exact location or may be a relative location such as, for example, the next location in a predetermined location order being followed by transmitter device 140 and receiver device 141.

In one embodiment, wireless communications link 107 transfers information from receiver device 141 to transmitter device 140 specifying antenna characteristics of phased array antenna 110, or vice versa.

An Example of a Transceiver Architecture

Figure 2:
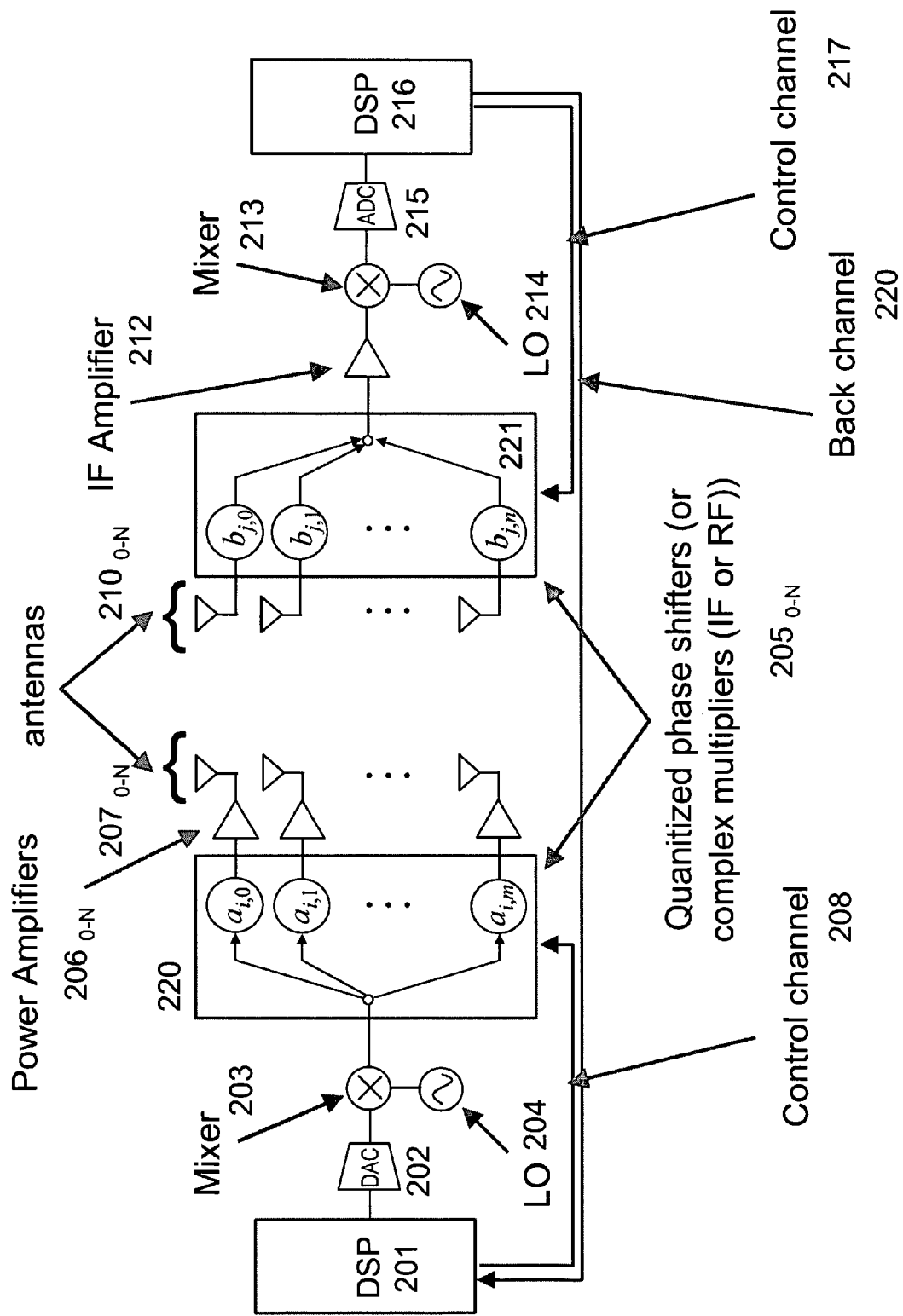
FIG. 2 is a more detailed block diagram of one embodiment of the communication system.

FIG. 2 is a block diagram of one embodiment of an adaptive beam forming multiple antenna radio system containing transmitter device 140 and receiver device 141 of FIG. 1. Transceiver 200 includes multiple independent transmit and receive chains. Transceiver 200 performs phased array beam forming using a phased array that takes an identical RF signal and shifts the phase for one or more antenna elements in the array to achieve beam steering.

Referring to FIG. 2, Digital Signal Processor (DSP) 201 formats the content and generates real time baseband signals. DSP 201 may provide modulation, FEC coding, packet assembly, interleaving and automatic gain control.

DSP 201 then forwards the baseband signals to be modulated and sent out on the RF portion of the transmitter. In one embodiment, the content is modulated into OFDM signals in a manner well known in the art.

Digital-to-analog converter (DAC) 202 receives the digital signals output from DSP 201 and converts them to analog signals. In one embodiment, the signals output from DAC 202 are between 0-256 MHz signals.

Mixer 203 receives signals output from DAC 202 and combines them with a signal from a local oscillator (LO) 204. The signals output from mixer 203 are at an intermediate frequency. In one embodiment, the intermediate frequency is between 2-9 GHz.

Multiple phase shifters $205_{0-N}$ receive the output from mixer 203. A demultiplier is included to control which phase shifters receive the signals. In one embodiment, these phase shifters are quantized phase shifters. In an alternative embodiment, the phase shifters may be replaced by complex multipliers. In one embodiment, DSP 201 also controls, via control channel 208, the phase and magnitude of the currents in each of the antenna elements in phased array antenna 220 to produce a desired beam pattern in a manner well-known in the art. In other words, DSP 201 controls the phase shifters $205_{0-N}$ of phased array antenna 220 to produce the desired pattern.

Each of phase shifters $205_{0-N}$ produce an output that is sent to one of power amplifiers $206_{0-N}$, which amplify the signal. The amplified signals are sent to antenna array 207 which has multiple antenna elements $207_{0-N}$. In one embodiment, the signals transmitted from antennas $207_{0-N}$ are radio frequency signals between 56-64 GHz. Thus, multiple beams are output from phased array antenna 220.

With respect to the receiver, antennas $210_{0-N}$ receive the wireless transmissions from antennas $207_{0-N}$ and provide them to phase shifters $211_{0-N}$. As discussed above, in one embodiment, phase shifters $211_{0-N}$ comprise quantized phase shifters. Alternatively, phase shifters $211_{0-N}$ may be replaced by complex multipliers. Phase shifters $211_{0-N}$ receive the signals from antennas $210_{0-N}$, which are combined to form a single line feed output. In one embodiment, a multiplexer is used to combine the signals from the different elements and output the single feed line. The output of phase shifters $211_{0-N}$ is input to intermediate frequency (IF) amplifier 212, which reduces the frequency of the signal to an intermediate frequency. In one embodiment, the intermediate frequency is between 2-9 GHz.

Mixer 213 receives the output of the IF amplifier 212 and combines it with a signal from LO 214 in a manner well-known in the art. In one embodiment, the output of mixer 213 is a signal in the range of 0-250 MHz. In one embodiment, there are I and Q signals for each channel.

Analog-to-digital converter (ADC) 215 receives the output of mixer 213 and converts it to digital form. The digital output from ADC 215 is received by DSP 216. DSP 216 restores the amplitude and phase of the signal. DSPs 211 may provide demodulation, packet disassembly, de-interleaving and automatic gain control.

In one embodiment, each of the transceivers includes a controlling microprocessor that sets up control information for DSP. The controlling microprocessor may be on the same die as the DSP.

DSP-Controlled Adaptive Beam Forming

In one embodiment, the DSPs implement an adaptive algorithm with the beam forming weights being implemented in hardware. That is, the transmitter and receiver work together to perform the beam forming in RF frequency using digitally controlled analog phase shifters; however, in an alternative embodiment, the beamforming is performed in IF. Phase shifters $205_{0-N}$ and $211_{0-N}$ are controlled via control channel 208 and control channel 217, respectfully, via their respective DSPs in a manner well known in the art. For example, DSP 201 controls phase shifters $105_{0-N}$ to have the transmitter perform adaptive beamforming to steer the beam while DSP 211 controls phase shifters $211_{0-N}$ to direct antenna elements to receive the wireless transmission from antenna elements and combine the signals from different elements to form a single line feed output. In one embodiment, a multiplexer is used to combine the signals from the different elements and output the single feed line.

DSP 201 performs the beam steering by pulsing, or energizing, the appropriate phase shifter connected to each antenna element. The pulsing algorithm under DSP 201 controls the phase and gain of each element. Performing DSP controlled phase array beamforming is well known in the art.

The adaptive beam forming antenna is used to avoid interfering obstructions. By adapting the beam forming and steering the beam, the communication can occur avoiding obstructions which may prevent or interfere with the wireless transmissions between the transmitter and the receiver.

In one embodiment, with respect to the adaptive beamforming antennas, they have three phases of operations. The three phases of operations are the training phase, a searching phase, and a tracking phase. The training phase and searching phase occur during initialization. The training phase determines the channel profile with predetermined sequences of spatial patterns $\{A\hat{i}\}$ and $\{B\hat{j}\}$. The searching phase computes a list of candidate spatial patterns $\{A\hat{i}\}$, $\{B\hat{j}\}$ and selects a prime candidate $\{A\hat{O}, B\hat{O}\}$ for use in the data transmission between the transmitter of one transceiver and the receiver of another. The tracking phase keeps track of the strength of the candidate list. When the prime candidate is obstructed, the next pair of spatial patterns is selected for use.

In one embodiment, during the training phase, the transmitter sends out a sequence of spatial patterns $\{A\hat{i}\}$. For each spatial pattern $\{A\hat{i}\}$, the receiver projects the received signal onto another sequence of patterns $\{B\hat{j}\}$. As a result of the projection, a channel profile is obtained over the pair $\{A\hat{i}\}$, $\{B\hat{j}\}$.

In one embodiment, an exhaustive training is performed between the transmitter and the receiver in which the antenna of the receiver is positioned at all locations and the transmitter sending multiple spatial patterns. Exhaustive training is well-known in the art. In this case, M transmit spatial patterns are transmitted by the transmitter and N received spatial patterns are received by the receiver to form an N by M channel matrix. Thus, the transmitter goes through a pattern of transmit sectors and the receiver searches to find the strongest signal for that transmission. Then the transmitter moves to the next sector. At the end of the exhaustive search process, a ranking of all the positions of the transmitter and the receiver and the signals strengths of the channel at those positions has been obtained. The information is maintained as pairs of positions of where the antennas are pointed and signal strengths of the channels. The list may be used to steer the antenna beam in case of interference.

In an alternative embodiment, bi-section training is used in which the space is divided in successively narrow sections with orthogonal antenna patterns being sent to obtain a channel profile.

Assuming DSP 101 is in a stable state and the direction the antenna should point is already determined. In the nominal state, the DSP will have a set of coefficients that it sends the phase shifters. The coefficients indicate the amount of phase the phase shifter is to shift the signal for its corresponding antennas. For example, DSP 101 sends a set digital control information to the phase shifters that indicate the different phase shifters are to shift different amounts, e.g., shift 30 degrees, shift 45 degrees, shift 90 degrees, shift 180 degrees, etc. Thus, the signal that goes to that antenna element will be shifted by a certain number of degrees of phase. The end result of shifting, for example, 16, 34, 32, 64 elements in the array by different amounts enables the antenna to be steered in a direction that provides the most sensitive reception location for the receiving antenna. That is, the composite set of shifts over the entire antenna array provides the ability to stir where the most sensitive point of the antenna is pointing over the hemisphere.

Note that in one embodiment the appropriate connection between the transmitter and the receiver may not be a direct path from the transmitter to the receiver. For example, the most appropriate path may be to bounce off the ceiling.

The Back Channel

In one embodiment, the wireless communication system includes a back channel, or link, for transmitting information between wireless communication devices (e.g., a transmitter and receiver, a pair of transceivers, etc.). The information is related to the beamforming antennas and enables one or both of the wireless communication devices to adapt the array of antenna elements to better direct the antenna elements of a transmitter to the antenna elements of the receiving device together. The information also includes information to facilitate the use of the content being wirelessly transferred between the antenna elements of the transmitter and the receiver.

In FIG. 2, back channel 220 is coupled between DSP 216 and DSP 201 to enable DSP 216 to send tracking and control information to DSP 201. In one embodiment, back channel 220 functions as a high speed downlink and an acknowledgement channel.

In one embodiment, the back channel is also used to transfer information corresponding to the application for which the wireless communication is occurring (e.g., wireless video). Such information includes content protection information. For example, in one embodiment, the back channel is used to transfer encryption information (e.g., encryption keys and acknowledgements of encryption keys) when the transceivers are transferring HDMI data. In such a case, the back channel is used for content protection communications.

More specifically, in HDMI, encryption is used to validate that the data sink is a permitted device (e.g., a permitted display). There is a continuous stream of new encryption keys that is transferred while transferring the HDMI datastream to validate that the permitted device hasn't changed. Blocks of frames for the HD TV data are encrypted with different keys and then those keys have to be acknowledged back on back channel 220 in order to validate the player. Back channel 220 transfers the encryption keys in the forward direction to the receiver and acknowledgements of key receipts from the receiver in the return direction. Thus, encrypted information is sent in both directions.

The use of the back channel for content protection communications is beneficial because it avoids having to complete a lengthy retraining process when such communications are sent along with content. For example, if a key from a transmitter is sent alongside the content flowing across the primary link and that primary link breaks, it will force a lengthy retrain of 2-3 seconds for a typical HDMI/HDCP system. In one embodiment, this separate bi-directional link that has higher reliability than the primary directional link given it's omni-directional orientation. By using this back channel for communication of the HDCP keys and the appropriate acknowledgement back from the receiving device, the time consuming retraining can be avoided even in the event of the most impactful obstruction.

During the active period when the beamforming antennas are transferring content, the back channel is used to allow the receiver to notify the transmitter about the status of the channel. For example, while the channel between the beamforming antennas is of sufficient quality, the receiver sends information over the back channel to indicate that the channel is acceptable. The back channel may also be used by the receiver to send the transmitter quantifiable information indicating the quality of the channel being used. If some form of interference (e.g., an obstruction) occurs that degrades the quality of the channel below an acceptable level or prevents transmissions completely between the beamforming antennas, the receiver can indicate that the channel is no longer acceptable and/or can request a change in the channel over the back channel. The receiver may request a change to the next channel in a predetermined set of channels or may specify a specific channel for the transmitter to use.

In one embodiment, the back channel is bi-directional. In such a case, in one embodiment, the transmitter uses the back channel to send information to the receiver. Such information may include information that instructs the receiver to position its antenna elements at different fixed locations that the transmitter would scan during initialization. The transmitter may specify this by specifically designating the location or by indicating that the receiver should proceed to the next location designated in a predetermined order or list through which both the transmitter and receiver are proceeding.

In one embodiment, the back channel is used by either or both of the transmitter and the receiver to notify the other of specific antenna characterization information. For example, the antenna characterization information may specify that the antenna is capable of a resolution down to 6 degrees of radius and that the antenna has a certain number of elements (e.g., 32 elements, 64 elements, etc.).

In one embodiment, communication on the back channel is performed wirelessly by using interface units. Any form of wireless communication may be used. In one embodiment, OFDM is used to transfer information over the back channel. In another embodiment, CPM is used to transfer information over the back channel.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. An apparatus comprising:
a processor;
a radio frequency (RF) transmitter having a digitally controlled phased array antenna coupled to and controlled by the processor to transmit content using adaptive beamforming over a first wireless communication channel to a receiver of the content; and
an interface to a second wireless communication channel coupled to the processor to communicate antenna information relating to the use of the phased array antenna to enable the processor to select a direction for the phased array antenna of the RF transmitter based on antenna location information of a phased array antenna of the receiver and performance information corresponding to the antenna location of the phased array antenna of the receiver, and to communicate information to facilitate playing the content, being wirelessly transferred on the first communication channel, at another location, including content protection information transmitted from the processor to the receiver through the second wireless communication channel, wherein the processor receives from the receiver through the interface to the second wireless communication channel an indication of the status of the first communication channel when the phased array antenna is operating in a mode during which the content may be transferred, and wherein the indication of the status comprises an indication from the receiver that prompts the processor to steer the beam of the digitally controlled phased array antenna in another direction in response to interference with transmission of portions of the content; and
wherein the content protection information comprises one or more of encryption keys sent by the processor and one or more acknowledgments sent from a receiver of one or more encryption keys from the processor.

2. The apparatus defined in claim 1 wherein the processor receives information via the interface to the second wireless communication channel when the phased array antenna of the RF transmitter is being initialized to enable the processor to select a direction to steer a beam formed by the phased array antenna of the RF transmitter.

3. The apparatus defined in claim 2 wherein the information to enable the processor to select a direction to steer the beam formed by the phased array antenna of the RF transmitter comprises antenna location information of the phased array antenna of the receiver and performance information corresponding to the antenna location.

4. The apparatus defined in claim 3 wherein the antenna location information and the performance information comprises one or more pairs that include an antenna position of the phased array antenna of the receiver and the signal strength of the channel for that antenna position.

5. The apparatus defined in claim 2 wherein the information to enable the processor to select a direction to steer the beam formed by the phased array antenna of the RF transmitter comprises information identifying one or more channels to be used by the processor.

6. The apparatus defined in claim 1 wherein the indication to prompt the processor to steer the beam in another direction includes information specifying one or more alternative channels.

7. The apparatus defined in claim 1 wherein the antenna information comprises information specifying one or more characteristics of a receiver to receive the content.

8. The apparatus defined in claim 1 wherein the second wireless communication channel is bi-directional.

9. The apparatus defined in claim 1 wherein the antenna information comprises information sent by the processor to specify a location to which a receiver designated to receive the content is to direct itself.

10. The apparatus defined in claim 9 wherein the location specifying the location indicates the receiver it to direct itself to the next location in a predetermined location order.

11. The apparatus defined in claim 1 wherein the antenna information indicates the quality of one or more channels and an indication from a receiver of the content to the processor to steer the beam to a different location.

12. The apparatus defined in claim 1 wherein the processor sends digital control information to the phased array antenna to indicate an amount to shift one or more phase shifters in the phased array antenna.

13. The apparatus defined in claim 12 wherein the digital control information comprises a set of coefficients.

14. The apparatus defined in claim 1 wherein the processor comprises a digital signal processor.

15. The apparatus defined in claim 1 wherein the processor generates baseband signals.

16. The apparatus defined in claim 15 wherein the baseband signals are orthogonal frequency division multiplex (OFDM) signals.

17. The apparatus defined in claim 1 further comprising:
a digital-to-analog converter to convert baseband signals into analog signals at a first frequency; and
a mixer to mix the analog signals with a signal from a local oscillator to produce adjusted analog signals with a second frequency higher than first frequency, the adjusted analog signals being sent to the phased array antenna for transmission thereby.

18. The apparatus defined in claim 17 wherein the phased array antenna comprises:
a demultiplexer coupled to receive the adjusted analog signals;
a plurality of phase shifters coupled to the demultiplexer to shift the phase of the adjusted analog signals based on control signals from the processor;
a plurality of amplifiers, wherein each of the plurality of amplifiers is coupled to an output of one of plurality of phase shifters; and
a plurality of antennas, wherein each of the plurality of antennas is coupled to an output of one of plurality of amplifiers.

19. The apparatus defined in claim 1 wherein the content adheres to the HDMI standard.

20. The apparatus defined in claim 1 wherein the content adheres to the DVI standard.

21. The apparatus defined in claim 1 wherein the transmitter is part of a transceiver.

22. An apparatus comprising:
a processor;
a radio frequency (RF) receiver having a digitally controlled phased array antenna coupled to and controlled by the processor to receive content from a transmitter using adaptive beamforming over a first wireless communication channel to a transmitter of the content; and
an interface to a second wireless communication channel coupled to the processor to communicate antenna information related to use of the phased array antenna to enable the transmitter to select a direction for a phased array antenna of the transmitter based on the antenna location information of the phased array antenna of the receiver and performance information corresponding to the antenna location of the phased array antenna of the receiver, and to communicate information to facilitate playing the content received from the transmitter over the first communication channel, including content protection information received by the receiver over the second wireless communication channel, wherein the processor sends an indication of the status of the first communication channel being received by the phased array antenna via the interface when the phased array antenna is operating in a mode during which content may be transferred, and wherein the indication from of the status comprises an indication from the receiver that prompts the transmitter to steer the beam of the phased array antenna of the transmitter in another direction in response to interference with transmission of portions of the content; and
wherein the content protection information comprises one or more of encryption keys sent by the processor and one or more acknowledgments sent from a receiver of one or more encryption keys from the processor.

23. The apparatus defined in claim 22 wherein the processor sends information via the second wireless communication channel interface when the phased array antenna of the RF receiver is being initialized to enable the transmitter to select a direction to steer a beam formed by its phased array antenna.

24. The apparatus defined in claim 23 wherein the information to enable the transmitter to select a direction to steer the beam formed by the phased array antenna comprises antenna location information of the phased array antenna of the receiver and performance information corresponding to the antenna location.

25. The apparatus defined in claim 24 wherein the antenna location information of the phased array antenna of the receiver and the performance information comprises one or more pairs that include an antenna position of the phased array antenna of the receiver and the signal strength of the channel for that antenna position.

26. The apparatus defined in claim 23 wherein the information to enable the transmitter to select a direction to steer the beam formed by the phased array antenna of the transmitter comprises information identifying one or more channels to be used by the transmitter.

27. The apparatus defined in claim 22 wherein the indication to prompt the transmitter to steer the beam in another direction includes information specifying one or more alternative channels.

28. The apparatus defined in claim 22 wherein the antenna information comprises information specifying one or more characteristics of a receiver.

29. The apparatus defined in claim 22 wherein the second wireless communication channel is bi-directional.

30. The apparatus defined in claim 22 wherein the antenna information comprises information sent by the processor to specify a location to which a receiver designated to receive the content is to direct itself.

31. The apparatus defined in claim 30 wherein the location specifying the location indicates the receiver it to direct itself to the next location in a predetermined location order.

32. The apparatus defined in claim 22 wherein the antenna information indicates the quality of one or more channels and an indication from a receiver of the content to the processor to steer the beam to a different location.

33. The apparatus defined in claim 22 wherein the processor sends digital control information to the phased array antenna to indicate an amount to shift one or more phase shifters in the phased array antenna.

34. The apparatus defined in claim 33 wherein the digital control information comprises a set of coefficients.

35. The apparatus defined in claim 22 wherein the processor comprises a digital signal processor.

36. The apparatus defined in claim 22 wherein signals from the phased array antenna are processed by the processor as baseband signals.

37. The apparatus defined in claim 36 wherein the baseband signals are orthogonal frequency division multiplex (OFDM) signals.

38. The apparatus defined in claim 22 further comprising:
an amplifier coupled to receive signals received by the phased array antenna;
a mixer to combine the analog signals with a signal from a local oscillator to produce adjusted analog signals a frequency lower than the frequency of the analog signals;
an analog-to-digital converter coupled to the mixer to convert the adjusted analog signals to digital signals that are processed by the processor.

39. The apparatus defined in claim 22 wherein the content adheres to the HDMI standard.

40. The apparatus defined in claim 22 wherein the content adheres to the DVI standard.

41. The apparatus defined in claim 22 wherein the receiver is part of a transceiver.

42. A peripheral comprising:
a receiver comprising
  a processor,
  a radio frequency (RF) receiver having a digitally controlled phased array antenna coupled to and controlled by the processor to receive content from a transmitter using adaptive beamforming, and
  an interface to a second wireless communication channel coupled to the processor to communicate antenna information related to use of the phased array antenna to enable the transmitter to select a direction for a phased array antenna of the transmitter based on the antenna location information of the phased array antenna of the receiver and performance information corresponding to the antenna location of the phased array antenna of the receiver, and to communicate information to facilitate playing the content received from the transmitter over the first communication channel, including content protection information received by the receiver over the second wireless communication channel, wherein the processor sends an indication of the status of the first communication channel being received by the phased array antenna via the interface when the phased array antenna is operating in a mode during which content may be transferred, and wherein the indication from of the status comprises an indication from the receiver that prompts the transmitter to steer the beam of the phased array antenna of the transmitter in another direction in response to interference with transmission of portions of the content, and
wherein the content protection information comprises encryption keys sent by the processor and wherein the receiver sends, on the second wireless communication channel, one or more acknowledgments corresponding to one or more encryption keys from the processor;
a display screen;
a display controller coupled to receive the content and to cause the content to be displayed on the display screen.

43. A peripheral comprising:
a receiver comprising
  a processor,
  a radio frequency (RF) receiver having a digitally controlled phased array antenna coupled to and controlled by the processor to receive content from a transmitter using adaptive beamforming, and
  an interface to a second wireless communication channel coupled to the processor to communicate antenna information related to use of the phased array antenna to enable the transmitter to select a direction for a phased array antenna of the transmitter based on the antenna location information of the phased array antenna of the receiver and performance information corresponding to the antenna location of the phased array antenna of the receiver, and to communicate information to facilitate playing the content received from the transmitter over the first communication channel, including content protection information received by the receiver over the second wireless communication channel, wherein the processor sends an indication of the status of the first communication channel being received by the phased array antenna via the interface when the phased array antenna is operating in a mode during which content may be transferred, and wherein the indication from of the status comprises an indication from the receiver that prompts the transmitter to steer the beam of the phased array antenna of the transmitter in another direction in response to interference with transmission of portions of the content, and
wherein the content protection information comprises encryption keys sent by the processor and wherein the receiver sends, on the second wireless communication channel, one or more acknowledgments corresponding to one or more encryption keys from the processor; and
a DVD device coupled to receive and play the content.

* * * * *